Patented Apr. 2, 1935

1,996,115

UNITED STATES PATENT OFFICE 1,996,115

ALKYL HALIDE SYNTHESIS

Wilbur Arthur Lazier, Wilmington, Del., assignor to E. I. du Pont de Nemours & Company, Wilmington, Del., a corporation of Delaware No Drawing. Application May 29, 1931,
Serial No. 541,107

12 Claims. (Cl. 260—166)

This invention relates to the production of fluorine-containing organic compounds and more particularly to the production of alkyl fluorides corresponding in structure to the simple aliphatic alcohols.

Alkyl halides have been employed as standard reagents for synthetic work since a very early period in the development of organic chemistry, but it is only recently that the uses for the aliphatic members of this class have become sufficiently extensive to encourage their manufacture on a commercial scale. Owing to a combination of circumstances even the alkyl fluorides have recently found a place in the realm of applied chemistry. For laboratory purposes the alcohols have long served as raw materials for the synthesis of aliphatic alkyl halides, but the corresponding olefines which are now readily obtained in large quantities as by-products from petroleum cracking, provide a much more attractive source of alkyl radicals, when considered from the standpoint of cost.

This invention has for an object the synthesis of organic fluorides from unsaturated hydrocarbons. A more specific object relates to provision of a successful process for the synthesis of alkyl fluorides by the direct combination of the corresponding unsaturated hydrocarbons with hydrogen fluoride.

The relative ease with which hydrogen halides may be caused to combine with olefines is determined by the molecular weights of both components of the reaction system. To state the problem specifically, higher olefines react more readily with the halogen acids to form alkyl halides than do ethylene or propylene. Similarly, hydrogen iodide adds to the lower olefines, with the greatest ease, hydrogen bromide somewhat less readily, hydrogen chloride with considerable difficulty and the reaction of hydrogen fluoride with olefines presents the greatest difficulty of all.

The following example illustrates a preferred method for synthesizing alkyl fluorides in accordance with the teachings of the invention.

Example

A gaseous mixture containing propylene and hydrofluoric acid in equimolecular proportions is continuously passed through a reaction vessel containing a catalyst prepared by impregnating activated charcoal with a solution of zinc fluoride dissolved in water with the aid of a little hydrofluoric acid, and drying the impregnated charcoal, the dried charcoal finally containing about 10% of zinc fluoride. The temperature of the catalyst is maintained at about 250° C. The gaseous mixture is introduced under a pressure of 750 lbs. per sq. in. (absolute), and passed through the reaction vessel at a space velocity of 200 volumes per unit volume of impregnated charcoal catalyst per hour. The reacted gaseous mixture emerging from the vessel contains a substantial percentage of a component shown by its boiling point and empirical molecular weight to be a propyl fluoride.

The above example illustrates the use of both elevated pressure and a catalyst for effecting the direct interaction of an olefine and hydrofluoric acid. The use of catalysts has a very beneficial effect on the reaction rate, but under favorable conditions of temperature and elevated pressure, the use of a catalyst may be dispensed with. In the preparation of the lower aliphatic fluorides such as ethyl and propyl fluorides, it is particularly desirable to use catalysts. However, when dealing with an olefine having at least four carbon atoms, good conversion is obtained by the use of pressure in the absence of a specific catalyst. Thus in the synthesis of secondary butyl fluoride, butylene and hydrogen fluoride may be brought together in a highly compressed condition at a temperature in the neighborhood of 100°–200° C. and in the absence of a catalyst with the production of good yields of secondary butyl fluoride.

Where catalysts are used in the synthesis comprising the present invention, they must be used in conjunction with superatmospheric pressure. Thus in the example given above, zinc fluoride under the influence of pressure gives high yields of propyl fluoride, and its effect is similar where ethylene and hydrofluoric acid are passed in contact therewith at a pressure of several atmospheres and at a mild heat. Zinc fluoride supported on activated charcoal, as described in the above example, is extremely active as a catalyst for the reaction even when used in amounts less than that described in the example, its favorable range of activity varying from 125°–250° C. within which temperature range it is preferably used. Many other metal fluorides, e. g., the fluorides of manganese, cobalt, iron and aluminum, either supported on a porous carrier or unsupported, may be used in place of zinc fluoride with equal success. Aluminum fluoride is especially active and may be used at temperatures much lower than indicated as optimum for the zinc fluoride catalyst. The fluorides of the metals contained in the second group of the periodic table are especially good catalysts. In addition to the above specifically mentioned catalysts, other metal fluorides are generally adaptable for use as catalysts for the reaction. Other compounds or salts of the metals which are convertible to fluorides under the reaction conditions of the synthesis may be employed as catalysts in place of the metal fluorides. The catalysts may, if desired, be supported on a suitable carrier such as activated charcoal. Other porous carriers may be used in place of activated charcoal, for example, silica gel and related highly adsorbent material comprise suitable supports for the catalyst.

The process of the present invention may be carried out in the gas phase, with or without the use of a solid catalyst, or it may be conducted in the liquid phase with a dissolved or suspended catalyst. Ordinarily the operating temperature for the liquid phase modification will be somewhat lower than for the vapor phase modification already described above, but the pressure requirements will be of the same order of magnitude. Practical yields are obtainable by this method at temperatures as low as 30° C. In carrying out this method, a solvent such as hexane is placed in an autoclave together with a quantity of aluminum fluoride. The reaction mixture, for example, compressed propylene and hydrogen fluoride, is admitted in approximately equal volumes at a pressure of 75 atmospheres and a temperature of 60° C. The reaction proceeds quantitatively until inhibited by a fall of the partial pressure of the reactants, owing to the building up of the concentration of inert gases.

The process may be continuous or intermittent. Where the reaction takes place in the vapor phase, the process is preferably continuous, whereas when the reaction takes place in the liquid phase, it is preferably carried on as a batch process, the alkyl fluoride being removed from the reaction zone, at the end of the run, by distillation. In the synthesis of alkyl fluorides the hydrogen fluoride has a tendency to add to the olefine to produce alkyl fluorides other than the normal fluorides. Thus in the example given above, the reacted gaseous mixture contained substantial quantities of isopropyl fluoride.

The molecular ratio of olefine to hydrofluoric acid is preferably maintained at approximately 1:1. This ratio however may be increased or decreased between wide limits.

The preferred operative pressures are usually in excess of 10 atmospheres but the best results with the lower olefines such as ethylene and propylene are obtainable at pressures as high or higher than 50 atmospheres. The upper limit of pressure is determined only by the equipment requirements and the increased tendency of the olefines to polymerize, and this latter consideration is also a function of the temperature and the nature of the catalyst used. The upper practical limit of pressure is probably in the neighborhood of 500 atmospheres.

The optimum space velocity for any set of reaction conditions may readily be determined by a simple experiment. The results obtained at any given space velocity will depend upon the activity of the catalyst, so that the space velocity will be regulated according to the particular catalyst used. The magnitude of the space velocity will conform in general to the rate of the reaction under the specific conditions under which the reaction is carried out.

The process of the present invention is applicable to the synthesis of fluorine-containing organic compounds from any one of a very large number of hydrocarbons. While it may be most advantageously applied to the use of gaseous olefines, it may also be used for the synthesis of alkyl fluorides from the liquid olefines and in syntheses starting with acetylenic hydrocarbons, or aromatic hydrocarbons containing unsaturated side chains. It may be used in syntheses involving the use of unsaturated organic compounds containing other functional groups, for example, the unsaturated alcohols, ketones, aldehydes, esters, ethers, or acids.

As many apparently and widely different embodiments of this invention may be made without departing from the spirit and scope thereof, it is to be understood that I do not limit myself to the specific embodiments thereof except as defined in the appended claims:

I claim:

1. A process of making alkyl fluorides which comprises causing hydrogen fluoride to react with an olefine of more than three carbon atoms under superatmospheric pressure and recovering the alkyl fluoride formed.

2. A process of making alkyl fluorides which comprises causing hydrogen fluoride to react with an olefine in contact with a hydrofluorination catalyst and under superatmospheric pressure.

3. A process of making alkyl fluorides which comprises causing hydrogen fluoride to react with an olefine in contact with a catalyst containing essentially a metal fluoride and under superatmospheric pressure.

4. A process of making an alkyl fluoride which comprises bringing a compressed mixture comprising a gaseous olefine and hydrogen fluoride into contact with a solid hydrofluorination catalyst.

5. A process of making an alkyl fluoride which comprises bringing a compressed mixture comprising a gaseous olefine and hydrogen fluoride into contact with a hydrofluorination catalyst dispersed in an inert liquid.

6. A process of making alkyl fluorides which comprises subjecting a mixture of an olefine of more than three carbon atoms and hydrogen fluoride to a pressure of at least 10 atmospheres and recovering the alkyl fluoride formed.

7. A process of making an alkyl fluoride which comprises subjecting a mixture of an olefine and hydrogen fluoride to a pressure of at least 10 atmospheres in contact with a catalyst comprising essentially a metallic fluoride.

8. A process of making a propyl fluoride which comprises heating a mixture of hydrogen fluoride and propylene at a temperature of 60–250° C. under a pressure of 10–500 atmospheres and in contact with a catalyst comprising essentially a metallic fluoride.

9. A process of making a propyl fluoride which comprises passing a mixture of hydrogen fluoride and propylene at a temperature of about 250° C. and under a pressure of 750 lbs. per sq. in. (absolute) over activated charcoal impregnated with zinc fluoride.

10. A process of making an alkyl fluoride which comprises subjecting a mixture of an olefine and hydrogen fluoride to a pressure of at least 10 atmospheres and to a temperature of 125° to 250° C. in contact with a catalyst comprising essentially a metal fluoride.

11. The process of claim 2 in which the catalyst is a member of the group consisting of the fluorides of the metals of group 2 of the periodic table, and the fluorides of manganese, cobalt, iron and aluminum.

12. The process of claim 2 in which the catalyst is supported on a porous carrier.

WILBUR A. LAZIER.